(12) United States Patent
Tumasz

(10) Patent No.: US 9,178,434 B2
(45) Date of Patent: Nov. 3, 2015

(54) INTEGRATED PRIMARY STARTUP BIAS AND MOSFET DRIVER

(71) Applicant: TEXAS INSTRUMENTS INCORPORATED, Dallas, TX (US)

(72) Inventor: Steven J. Tumasz, Chichester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

(21) Appl. No.: 13/874,056

(22) Filed: Apr. 30, 2013

(65) Prior Publication Data

US 2014/0321170 A1  Oct. 30, 2014

(51) Int. Cl.
*H02M 3/335* (2006.01)
*H02M 1/36* (2007.01)

(52) U.S. Cl.
CPC ...... *H02M 3/33538* (2013.01); *H02M 3/33576* (2013.01); *H02M 1/36* (2013.01); *H02M 3/33523* (2013.01)

(58) Field of Classification Search
CPC .................................. H02M 1/14; H02M 1/15
USPC ........................... 323/282–288, 221, 224, 21; 363/21.08–21.18, 127, 49, 363/56.01–56.12
See application file for complete search history.

(56) References Cited

U.S. PATENT DOCUMENTS

| | | | | |
|---|---|---|---|---|
| 3,701,937 A | * | 10/1972 | Combs | 363/25 |
| 5,757,627 A | * | 5/1998 | Faulk | 363/21.14 |
| 5,940,287 A | * | 8/1999 | Brkovic | 363/127 |
| 2002/0122320 A1 | * | 9/2002 | Brkovic | 363/21.08 |
| 2012/0294052 A1 | * | 11/2012 | Reddy et al. | 363/49 |

* cited by examiner

*Primary Examiner* — Harry Behm
*Assistant Examiner* — Peter Novak
(74) *Attorney, Agent, or Firm* — William B. Kempler; Frank D. Cimino

(57) ABSTRACT

Some implementations are directed to a A DC-to-DC converter that includes a power transformer having a primary side and a secondary side and a plurality of power transistors coupled to the primary side of the transformer. The converter also includes a secondary bias supply coupled to the secondary side of the transformer and a secondary side controller coupled to the secondary side of the transformer and configured to generate a feedback control signal based on a voltage level associated with the secondary side of the transformer. The secondary side controller receives operating power only from the secondary bias supply.

7 Claims, 6 Drawing Sheets

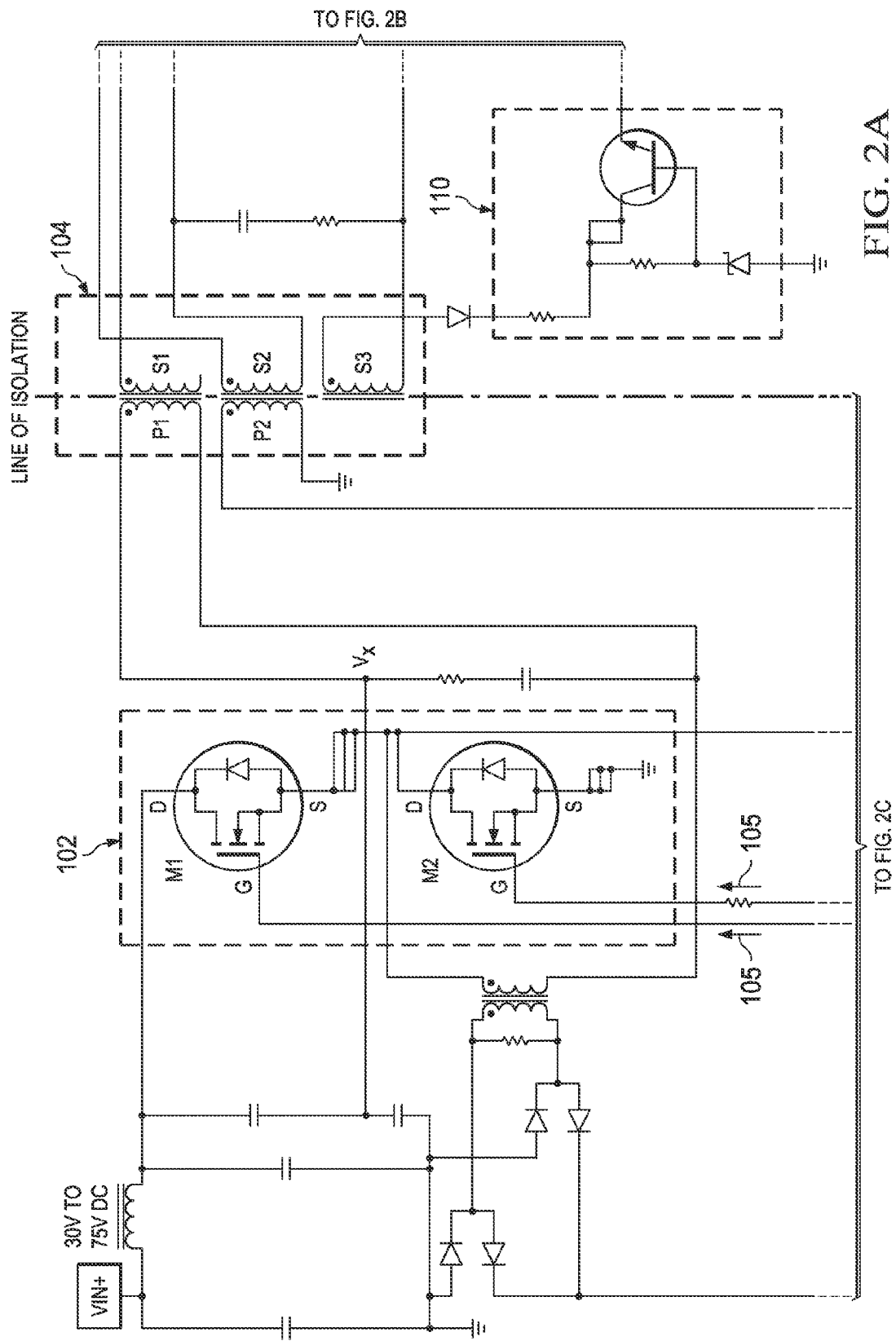

INTEGRATED PRIMARY STARTUP BIAS AND MOSFET DRIVER

CROSS-REFERENCE TO RELATED APPLICATION

NONE.

BACKGROUND

In a typical isolated DC-to-DC converter, the control integrated circuit (IC) for regulation can be placed either on the primary side of the power transformer, where the input voltage is applied, or the secondary side of the transformer, where the output voltage is delivered to a load. When the controller is placed on the primary side, it is straightforward to obtain the required bias voltage and current from the input voltage during startup. This can be accomplished by a variety of means such as resistor dividers, simple linear regulators and so on. As long as the main power converter has been switched on, the required bias voltage and current can be derived from the main power transformer.

However, in general, it is preferred to utilize the secondary side alone for controlling the regulation of the output voltage since doing so normally produces the lowest distortion of the desired ramp-up curve together with efficient startup performance. When the controller is placed on the secondary side, during a startup phase of the converter, there is no bias voltage and current readily available from the transformer's secondary side to the controller and the associated circuitry. Thus, a smaller converter is placed on the primary side to power both the primary circuits and the secondary circuitry through an isolated output. This smaller converter requires a controller and a transformer to provide the isolated output for the secondary side. Unfortunately this extra converter adds additional cost for another transformer to meet the isolation requirements of the design and requires additional space on the printed circuit board, which causes critical concerns in terms of designing an isolated DC-to-DC converter.

SUMMARY

One implementation is directed to an integration of a startup circuit and a transistor driver into a DC-to-DC converter. In general, the DC-to-DC converter steps up or steps down the input DC voltage to a desired DC output voltage required by the load. The DC-to-DC converter comprises a secondary side PWM controller to regulate the output DC voltage and an integrated transistor driver and PWM controller on the primary side of the transformer.

The integrated transistor driver and PWM controller serves as the startup circuit before the main transformer is fully charged and able to transmit power to the secondary side of the transformer. A converter with such an integrated transistor driver and PWM controller requires no additional bias transformer on the primary side of the main transformer to power the startup circuit. Meanwhile, while sending power from the primary side to the secondary side to energize the secondary side PWM controller, the integrated transistor and PWM controller temporarily controls the converter. Once a plurality of pulses are transmitted via a loop from the secondary side PWM controller to the integrated transistor driver and PWM controller, the integrated transistor driver and PWM controller replaces the control signals to drive power transistors on the primary side of the transformer with those gate drive pulses provided by the secondary side PWM controller.

Another implementation is directed to a method of operating the DC-to-DC converter. The method performed switches on the converter and enables power to be continually transmitted from the primary side to the secondary side of the main transformer, thereby charging up the secondary side PWM controller. This comprises: detecting a presence of a gate drive control signal from the secondary side PWM controller in the DC-to-DC converter. More particularly, in the absence of detection of the gate drive control signal, the integrated transistor and PWM controller on the primary side sends the signals to control power transistors on the primary side of the transformer. In the presence of the gate drive signal detected by the integrated driver and PWM controller, the secondary side PWM controller takes over the control of regulating the output voltage.

BRIEF DESCRIPTION OF THE DRAWINGS

For a detailed description of exemplary embodiments of the invention, refer to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As will be explained below, embodiments of the invention are directed to a DC-to-DC converter: comprises an integrated transistor driver and pulse width modulation (PWM) controller which advantageously avoids the need for an additional transformer as noted above despite the use of a secondary side PWM controller. The DC-to-DC converter according to the present disclosure operates using the disclosed integrated transistor driver and PWM controller 120 as shown in block-diagram form in FIG. 1. Other architectures are possible as well.

Figure 1:
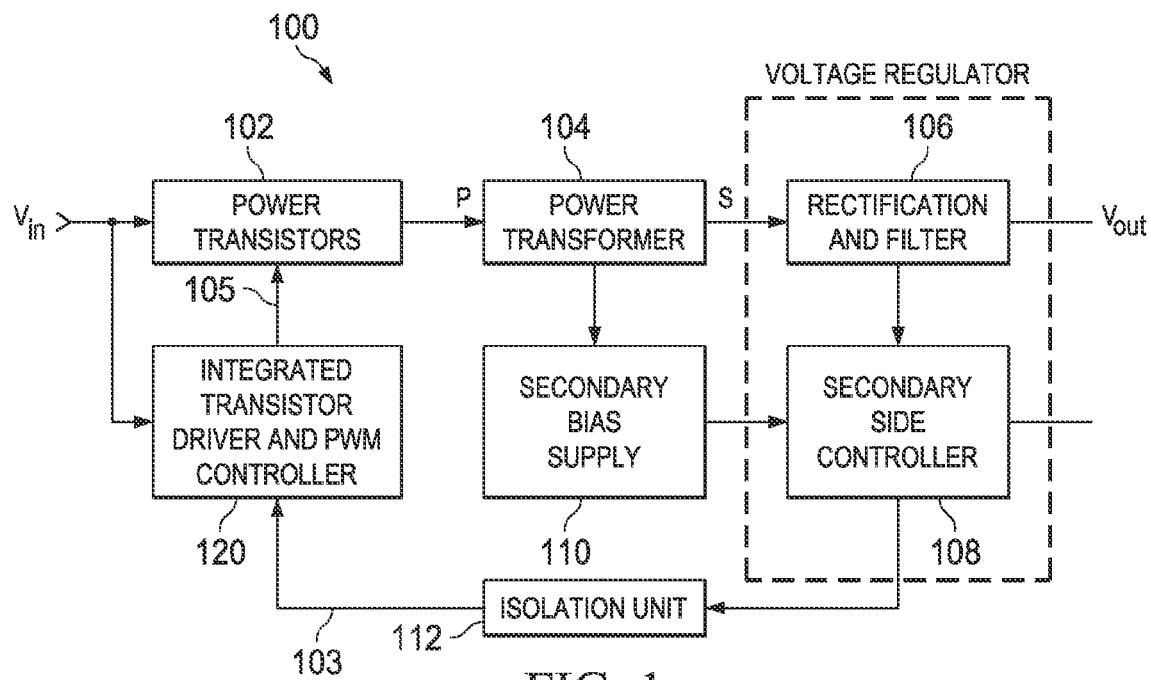
FIG. 1 shows a block diagram of a DC-to-DC converter according to an embodiment of the invention.
Figure 2:
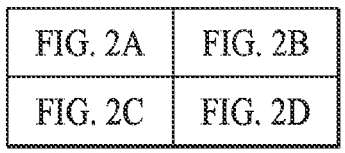
FIG. 2A-2D is detailed circuit diagram of a DC-to-DC converter according to an embodiment of the invention.

The DC-to-DC converter 100 illustrated in FIG. 1 comprises a main power transformer 104 associated with a plurality of power transistors 102 coupled to the primary side of a transformer 104, a rectifier and filter 106 and a secondary side PWM controller 108 directly connected to the load on the secondary side of the transformer 104. The primary side of the transformer 104 is designated as "P" and the secondary side is designated as "S". The secondary side PWM controller 108 is coupled to an integrated transistor driver and PWM controller 120 via an isolation unit 112. The integrated transistor driver and PWM controller 120 is controlled either by the gate drive signals transmitted from the secondary side PWM controller 108 or (e.g., during startup) by pulses generated internally in the integrated transistor driver and PWM controller 120, as will be illustrated below.

In the preferred embodiment, the secondary side PWM controller 108 receives power solely from the secondary bias supply 110, which is galvanically isolated from the primary side of the transformer 104.

Power transistors 102 function to convert the DC input voltage ($V_{in}$) to an AC voltage to be provided to the transformer 104. The integrated transistor driver and PWM controller 120 is coupled to the power transistors 102 by a gate drive signal 105, which turns the transistors 102 on and off to generate the AC voltage. The integrated transistor driver and PWM controller 120 asserts the gate drive signal 105 based on either a gate drive signal 103 from the secondary side PWM controller 108 or pulses generated internally in the controller 120.

The secondary side PWM controller 108 is powered by the secondary side S of the transformer 104 and functions to control the timing of power transistors 102 to provide the AC voltage necessary to be transformed by the transformer 104. Initially, the secondary side PWM controller 108 is off. Because that controller 108 is off, the power transistors 102 are not turned on till the appropriate timing to provide an AC voltage. Because no AC voltage is provided to the transformer 104, there is no voltage generated on the transformer's secondary side S, and thus secondary side PWM controller 108 can never be turned on. For this reason, a startup capability is provided which in part is the function performed by the integrated transistor driver and PWM controller 120. The startup capability of the controller 120 temporarily operates the power transistors 102 long enough for the transformer 104 to produce a voltage on its secondary side S to power the secondary side PWM controller 108. Once the secondary side PWM controller 108 is turned on, the secondary side PWM controller 108 continues to control the power transistors 102 instead of being operated by the integrated transistor driver and PWM controller 120.

To reliably start up the transformer and further transmit power via secondary bias supply 110 to switch on the secondary side PWM controller 108, the integrated transistor driver and PWM controller 120 provides a circumventive approach to reliably start up the DC-to-DC converter 100 without an auxiliary bias transformer on the primary side. During startup and before the secondary side controller 108 has been fully charged and switched on, the integrated transistor driver and PWM controller 120 provides the control signal 105, generated by its internal pulse generator, to drive the power transistors 102. The control signal 105, a plurality of pulses, switches on the power transistors 102 for the duration of the pulses so as to apply a pulse of the input voltage to the primary side P of the transformer 104.

After the secondary side PWM controller 108 has been fully switched on via being charged by the coupled transformer 104, pulses 103 from the secondary side PWM controller 108 are transmitted through the loop to the integrated transistor driver and PWM controller 120 on the primary side. The integrated transistor driver and PWM controller 120 detects these pulses, and disables pulses generated internally, and forward the pulses 103 from the secondary side PWM controller 108 to the power transistors 102 as control signal 105. As such, the secondary side PWM controller 108 takes over and regulates the desired output voltage on the secondary side of the transformer 104. Thus, the integrated transistor driver and PWM controller 120 uses its internal pulse generator to control the power transistors 102 only temporarily during startup until the secondary side PWM controller 108 turns on and is operating.

FIG. 2A-2D shows an example of a detailed circuit implementation of the DC-to-DC converter as seen in FIG. 1. The same reference numerals are used to denote the same blocks as those used in FIG. 1. The power transistors 102 comprise a half-bridge converter and function as a step-down converter. In the example of FIG. 2A-2D, the power transistors 102 include two enhancement mode N-channel power MOS (NMOS) transistors, M1 and M2. Power MOSFETs are chosen due to their capability of handling significant input power level and low on-state resistance. Other types of transistors, including but not limited to insulated-gate bipolar transistors (IGBTs), gate turn-off thyristors (GTOs) and bipolar junction transistors (BJTs), and doping schemes can be implemented in such power transistors as well.

Still more specifically, switching transistors M1 and M2 are turned on and off alternatively based on the signal 105 with a duty cycle programmed by the integrated transistor driver and PWM controlled 120 to switch or chop the supplied DC input voltage ($V_{in}$) into pulses varied with time, i.e. transforming the DC input voltage source into an AC voltage before feeding into the primary side of the transformer 104. The voltage at node $V_x$, coupled to the source end of the power transistor M1 and the drain end of M2, is the input signal for the winding P1 on the primary side of the transformer 104.

Subsequently, the AC voltage supplied on the primary side P1 of the transformer 104 is transmitted through the transformer 104 to the secondary windings S1 and S2. After being rectified and filtered by the rectifier and filter 106, $V_{out}$ is derived as a function of input voltage $V_{in}$, $V_{out}=(V_{in}/2)\times(f)\times$(Con, M1+Con, M2)$\times$(n2/n1), where f is the operating frequency, Con, M1 and Con, M2 are the conduction time of power transistors M1 and M2 respectively, n1 is the number of turns of primary winding P1 and n2 is the number of turns of secondary winding S1 and S2.

Assuming that the transformer 104 has been fully charged so that power is provided to the secondary side PWM controller 108, the controller 108 is on and responsible for generating PWM pulses to control the power transistors 102, thereby regulate the output voltage coupled to the load. The secondary side PWM controller 108 is a PWM controller, designed to regulate the power supply switched duty cycle.

Output signals 107 and 109 from pins SRA and SRB of the secondary side PWM controller 108 are coupled to a gate driver 114. Power transistors M3 and M4 in the block 106 function as the rectifier and filter 106 via the gate driver 114 based on the signals 107 and 109 regulated by the secondary side PWM controller 108. The gate driver 114 may be used to deliver large peak currents into driving power transistors, M3 and M4. The rectifier and filter 106 is utilized to rectify the AC signals and smooth out all the ripples and noises inevitably generated through power transmission.

Referring still to FIG. 2A-2D, output signals 111 and 113 generated from the pins OUTA and OUTB of the secondary side PWM controller 108 are coupled to the integrated transistor driver and PWM controller 120 via an isolation unit 112 (e.g., a transformer). After startup, the output signals, 111 and 113, transmitted as gate drive signals to the integrated transistor driver and PWM controller 120 cause the internal pulse generator of the integrated transistor driver and PWM controller 120 to be disabled and also are provided as control signals 105 to the power transistors 102. Alternatively, the internal pulse generator is operating at a stand-by mode despite being resigned as the provider of the control signals 105. The detailed operating mechanism of the integrated transistor driver and PWM controller 120 will be further described below.

Before the DC-to-DC converter 100 is fully energized, a startup circuit (e.g. the integrated transistor driver and PWM controller 120) on the primary side provides a means to start up the primary referenced power switching circuit while maintaining the output within acceptable limits and energizing the main transformer during the startup transient. When the voltage at the output node ($V_{out}$) has reached a threshold (e.g., the desired final output voltage), the startup circuit will be disabled from the voltage regulator, which is the secondary controller in this invention.

In a preferred embodiment of the invention, the integrated transistor driver and PWM controller 120 is powered by the main transformer 104 without an auxiliary bias transformer.

Figure 3:
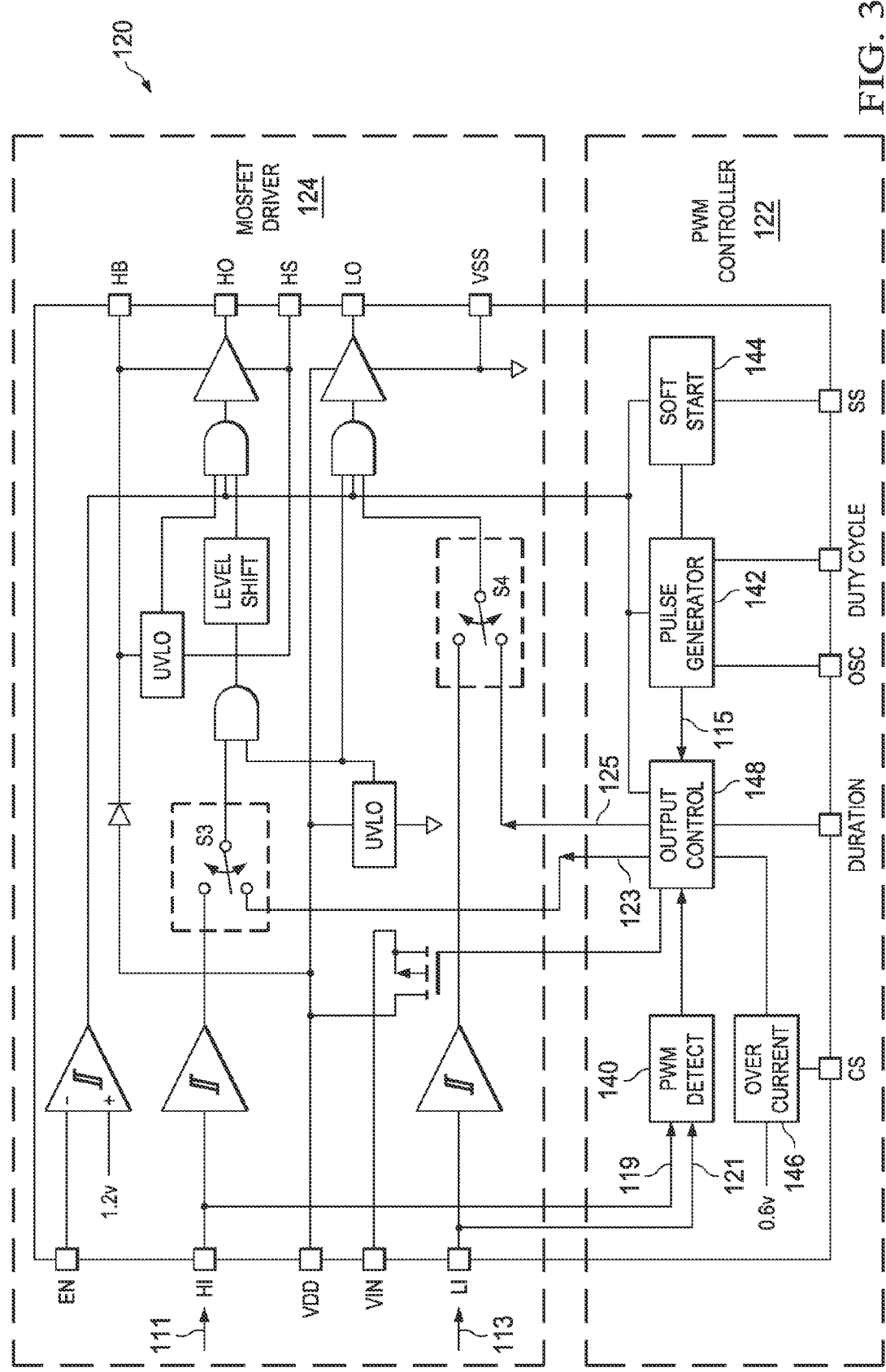
FIG. 3 illustrates a block diagram of a more detailed implementation of the integrated transistor and PWM controller of FIG. 1.

FIG. 3 depicts the illustrative embodiment of the circuit of the proposed integrated transistor driver and PWM controller 120. As shown, the integrated transistor driver and PWM controller 120 comprises: a regular MOSFET driver 124 and a PWM controller 122. In the example of FIG. 3, the PWM controller 122 comprises a PWM DETECT 140, an internal PULSE GENERATOR 142, a SOFT START 144, an Over Current protection 146 and an OUTPUT CONTROL 148. The MOSFET driver 124, serving as an amplifier, comprises two switches S3 and S4 to selectively receive input signals from pins HI and LI based on the gate drive signals 111 and 113 from the secondary side PWM controller 108 or signals 123 and 125 generated internally by the PULSE GENERATOR 142 of the PWM controller 122.

The PWM controller 122 serves as the startup circuit during switching on the main transformer 104. During startup and before the secondary side PWM controller 108 is charged and operating, the internal PULSE GENERATOR 142 generates a series of pulses 115 with a pre-programmed duty cycle feeding into the OUTPUT CONTROL 148, which further controls the switches S3 and S4 to be coupled to the PWM controller 122. Through a amplification of the signals 123 and 125 received from the PWM controller 122, the output signals from the HO and LO outputs are received at the gates of the power transistors M1 and M2, thus operating M1 and M2 during the startup phase.

Once the secondary side PWM controller 108 is fully charged and operating after the startup, HI and LI of the MOSFET driver 124 receive signals from signals 111 and 113 provided by the secondary side PWM controller 108. Consequently, the PWM DETECT 140 detects the presence of signals 119 and 121 from HI and LI, indicating that the secondary side PWM controller 108 is in control of regulating output voltage of the converter 100. As a result, the OUTPUT CONTROL 148 causes the switches S3 and S4 to receive the HI and LI signals from the secondary side PWN controller 108 instead of the internally generated pulses 123 and 125. Specifically, the OUTPUT CONTROL 148 provides signals, not shown herein in FIG. 3, to control the switches S3 and S4 to be switched either receiving signals from HI and LI or the internally generated pulses 123 and 125.

Figure 4:
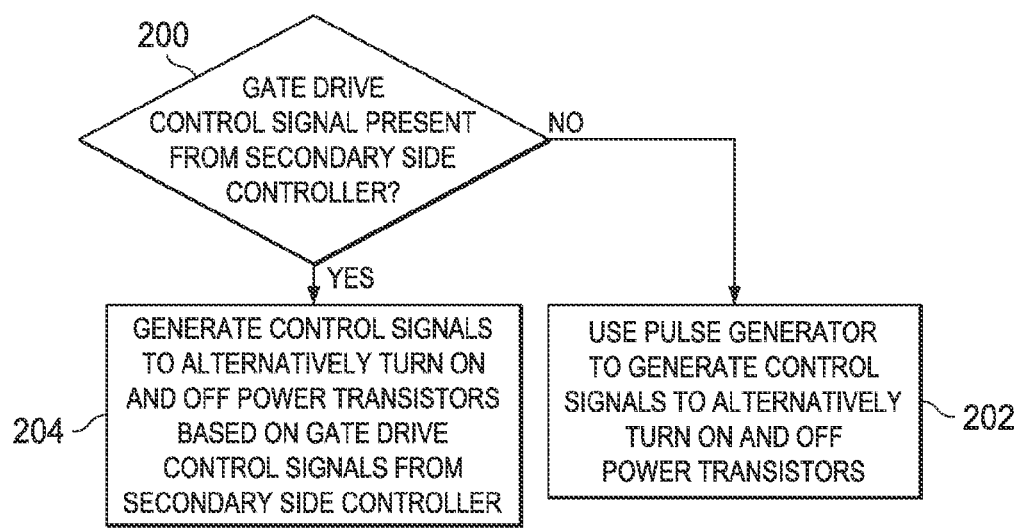
FIG. 4 is a flow chart showing the processing operations performed by an integrated transistor driver and PWM controller to determine the presence of detecting a gate drive control signal from a secondary side controller.
Figure 2B:
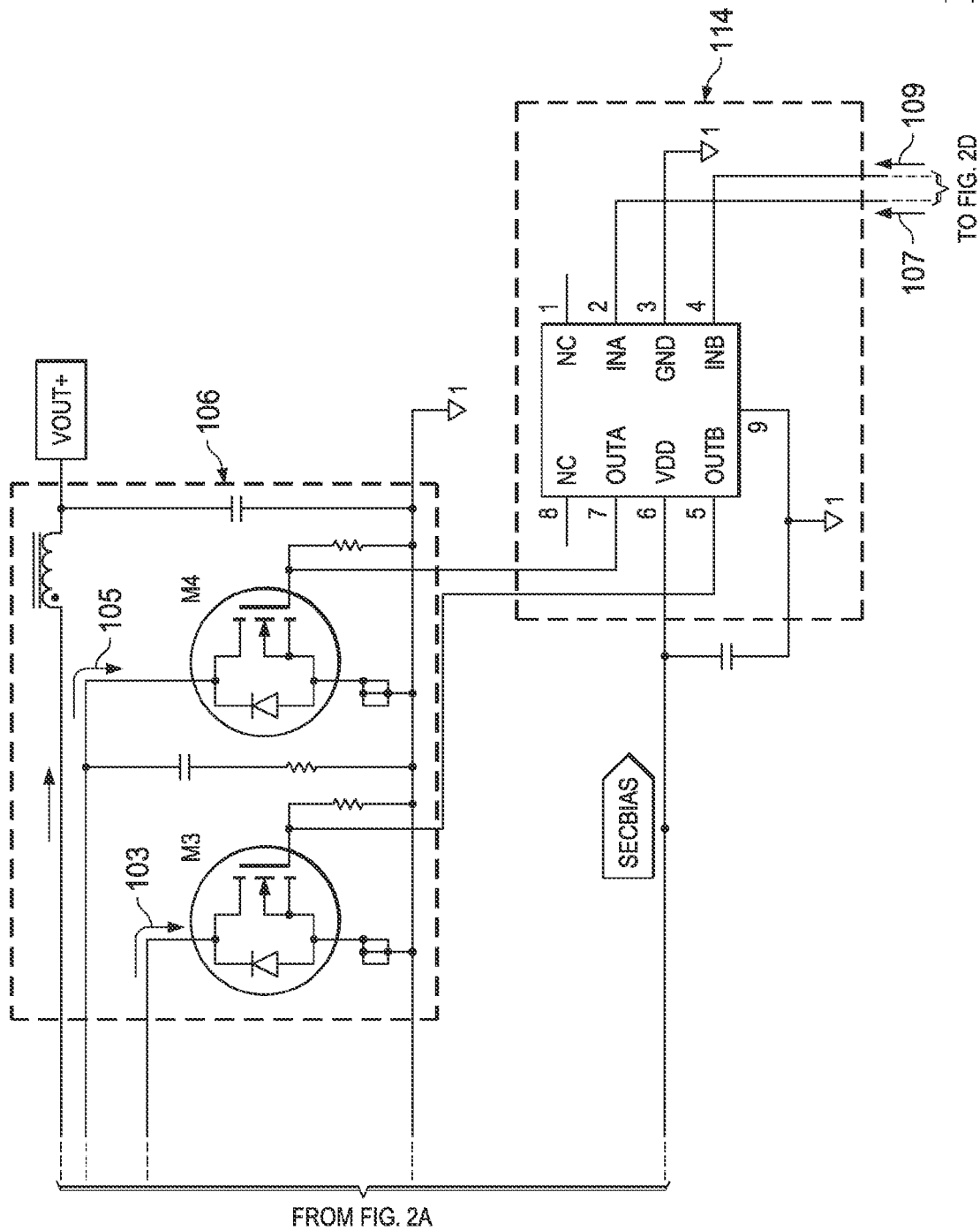
Figure 2C:
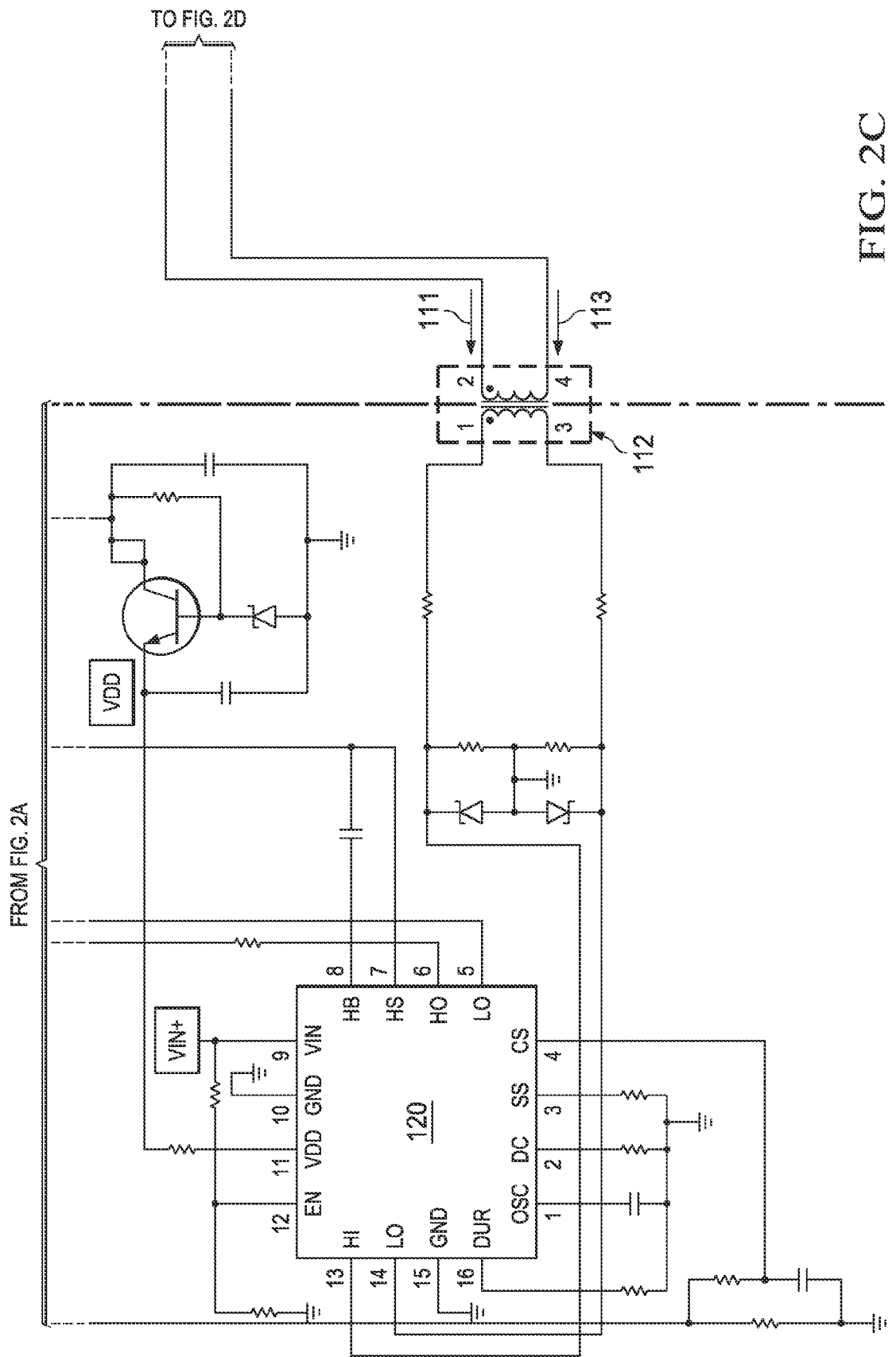
Figure 2D:
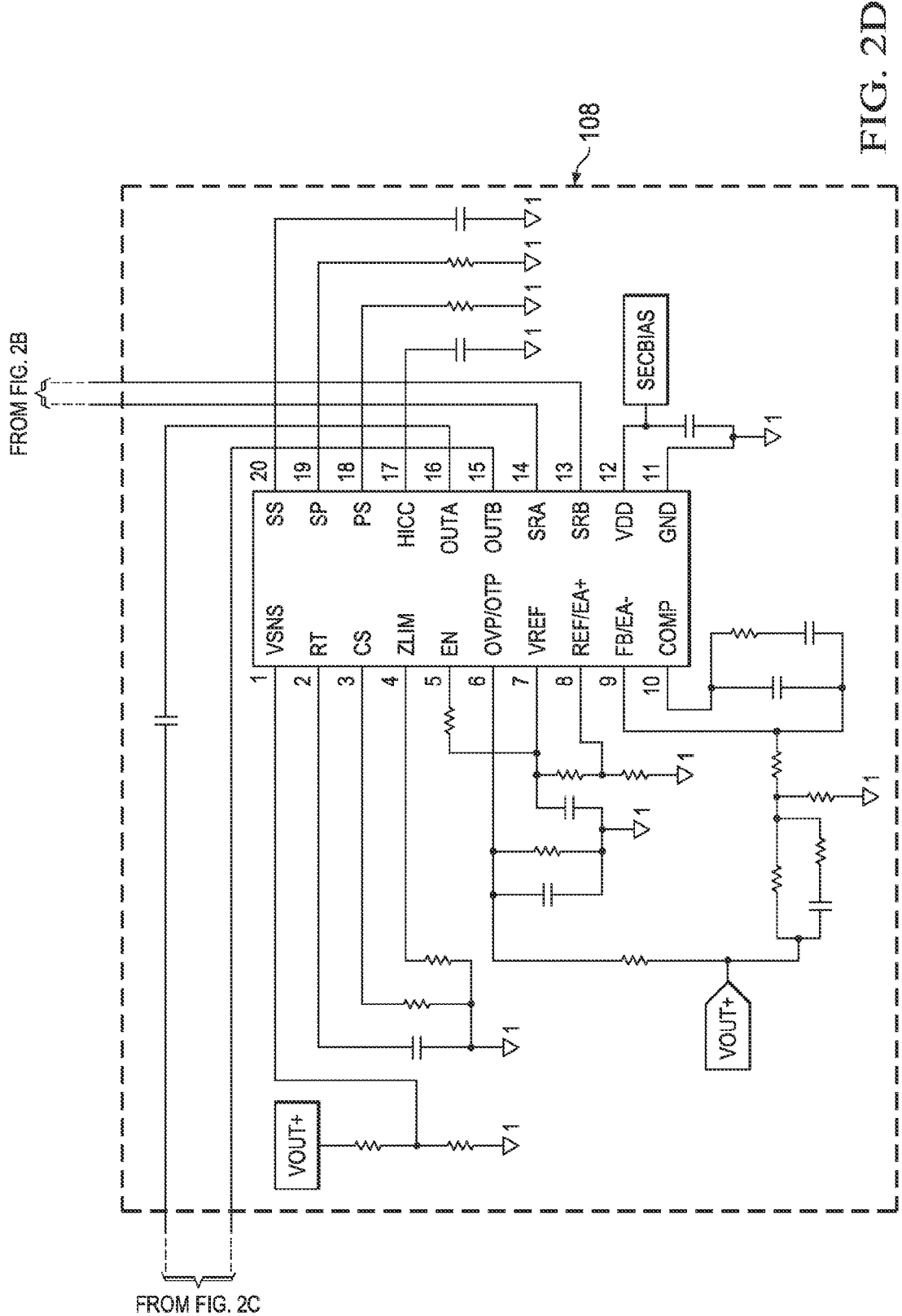

FIG. 4 shows a preferred method of the present invention to operate the DC-to-DC converter 100 using the disclosed integrated transistor driver and PWM controller 120:

Block 200 provides an acknowledgement mechanism to determine whether the presence of detecting the gate drive control signal from the secondary side PWM controller 108;

Block 202 causes the pulse generator in the integrated transistor driver and PWM controller 120 to drive the coupled power transistors 102 under the lack of the gate drive control signal;

Block 204 switches off the pulse generator and drives the coupled power transistors 102 based on the gate drive control signal from the secondary side PWM controller 108.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC-to-DC converter, comprising:
   a power transformer having a primary side and a secondary side;
   a plurality of power transistors coupled to the primary side of the transformer;
   a secondary bias supply coupled to the secondary side of the transformer; and
   a secondary side controller coupled to the secondary side of the transformer and configured to generate a feedback control signal based on a voltage level associated with the secondary side of the transformer;
   further comprising an integrated transistor driver and pulse width modulation (PWM) controller that receives an input voltage of the DC-to-DC converter, and wherein, during startup, the secondary side controller receives operating power from the integrated transistor driver and PWM controller controlling the plurality of power transistors, but after startup, the secondary side controller instead receives operating power derived from an output voltage from the secondary side of the transformer;
   wherein the integrated transistor driver and PWM controller includes:
   a pulse generator that generates pulse signals to be used during startup to control the plurality of power transistors; and
   a plurality of switches, each switch selects either one of the pulse signals from the pulse generator or a gate drive control signal from the secondary side controller to control one of the power transistors;
   further comprising a PWM detect unit to detect a presence of the gate drive control signal from the secondary side controller and to cause the switches to be controlled on the basis of whether the gate drive control signal is detected; and wherein the PWM detect unit disables the pulse generator when detecting a presence of the gate drive control signal from the secondary side controller.

2. The DC-to-DC converter of claim 1 wherein the PWM detect unit causes an output to control the switches between two states, a first state, during startup, in which the power transistors are controlled by the pulse signals and a second state, after startup, in which the power transistors are controlled by the gate drive control signals from the secondary side controller.

3. The DC-to-DC converter of claim 1 wherein during startup the DC-to-DC converter operates in an unregulated fashion, but after startup, the DC-to-DC converter operates in a regulated fashion.

4. A DC-to-DC converter, comprising:
   a power transformer having a primary side and a secondary side;
   a plurality of power transistors coupled to the primary side of the transformer;
   a secondary side controller coupled to the secondary side of the transformer and configured to generate a gate drive control signal based on a voltage level associated with the secondary side of the transformer; and
   an integrated transistor driver and pulse width modulation (PWM) controller to receive the gate drive control signal from the secondary side controller and to selectively generate transistor control signals to the power transistors based on either the gate drive control signal from the secondary side controller or based on a pulse signal from an internal pulse generator; and wherein the integrated transistor driver and PWM controller comprises;
   a pulse generator to generate and provide a plurality of pulse signals to be used during startup to control the plurality of power transistors;
   a plurality of switches that selectively provide the gate drive control signal or a pulse signal from the pulse generator to the power transistors;
   a PWM detect unit to detect a presence of the gate drive control signal from the secondary side controller and to generate a detect signal that indicates whether the gate drive control signal has been detected; and
   an output control unit to control the switches based on the detect signal from the PWM detect unit.

5. The DC-to-DC converter of claim 4 wherein when the PWM detect unit detects a presence of the gate drive control signal from the secondary side controller, the PWM detect unit disables the pulse generator and generates a detect signal that indicates the gate drive control signal has been detected.

6. The DC-to-DC converter of claim 4 wherein the PWM detect unit causes an output to control the switches between two states, a first state, during startup, in which the power transistors are controlled by the pulse signals and a second state, after startup, in which the power transistors are controlled by the gate drive control signals from the secondary side controller.

7. The DC-to-DC converter of claim 4 wherein during startup the DC-to-DC converter operates in an unregulated fashion, but after startup, the DC-to-DC converter operates in a regulated fashion.

* * * * *